(12) United States Patent
Kalyanadurga et al.

(10) Patent No.: US 7,896,601 B2
(45) Date of Patent: Mar. 1, 2011

(54) TWO-PIECE FASTENER

(75) Inventors: Vishwanath Kalyanadurga, Ypsilanti, MI (US); Venkata Kanchumarthy, Canton, MI (US)

(73) Assignee: Marimba Auto, LLC, Belleville, MI (US)

( * ) Notice: Subject to any disclaimer, the term of this patent is extended or adjusted under 35 U.S.C. 154(b) by 0 days.

(21) Appl. No.: 12/357,790

(22) Filed: Jan. 22, 2009

(65) Prior Publication Data
US 2010/0180410 A1 Jul. 22, 2010

(51) Int. Cl.
*F16B 19/00* (2006.01)
(52) U.S. Cl. .......................................... 411/510; 411/508
(58) Field of Classification Search .......... 411/508–510, 411/339; 24/297
See application file for complete search history.

(56) References Cited

U.S. PATENT DOCUMENTS

| | | | | |
|---|---|---|---|---|
| 4,420,859 A | * | 12/1983 | Hammerle | |
| 4,532,926 A | | 8/1985 | O'Halla | |
| 4,568,215 A | | 2/1986 | Nelson | |
| 4,936,530 A | | 6/1990 | Wollar | |
| 5,007,779 A | * | 4/1991 | Goran | |
| 5,606,784 A | * | 3/1997 | Hamamoto | |
| 5,765,787 A | | 6/1998 | de Beers | |
| 5,907,891 A | | 6/1999 | Meyer | |
| 5,975,820 A | * | 11/1999 | Kirchen | |
| 6,119,306 A | * | 9/2000 | Antonucci et al. | |
| 6,712,571 B2 | * | 3/2004 | Krohlow et al. | |
| 6,804,864 B2 | * | 10/2004 | Kirchen et al. | |
| 6,813,865 B2 | | 11/2004 | Peterson | |
| 7,017,239 B2 | * | 3/2006 | Kurily et al. | |
| 7,188,393 B2 | * | 3/2007 | Kawai | |
| 2007/0134073 A1 | | 6/2007 | Shereyk | |

* cited by examiner

*Primary Examiner* — Gary Estremsky
(74) *Attorney, Agent, or Firm* — Jay M. Schloff

(57) ABSTRACT

Disclosed is a fastener that comprises a stud member and a nut member. The stud member includes a base portion, a stem, a plurality of locating features, and, a plurality of slanted ridges. The stem has a head portion and a body portion, where the body portion is positioned on the base portion for enabling the stem to extend vertically from the base portion. The plurality of locating features extends from the body portion, and is disposed on the base portion. The plurality of slanted ridges extends from the stem. The nut member includes a central element configured to have two projecting members extending opposite to each other from a periphery of the central element. The central element comprises an aperture therewithin for receiving the stem therethrough and for interlocking the nut member with the stud member to retain the stud member at a locked configuration.

6 Claims, 6 Drawing Sheets

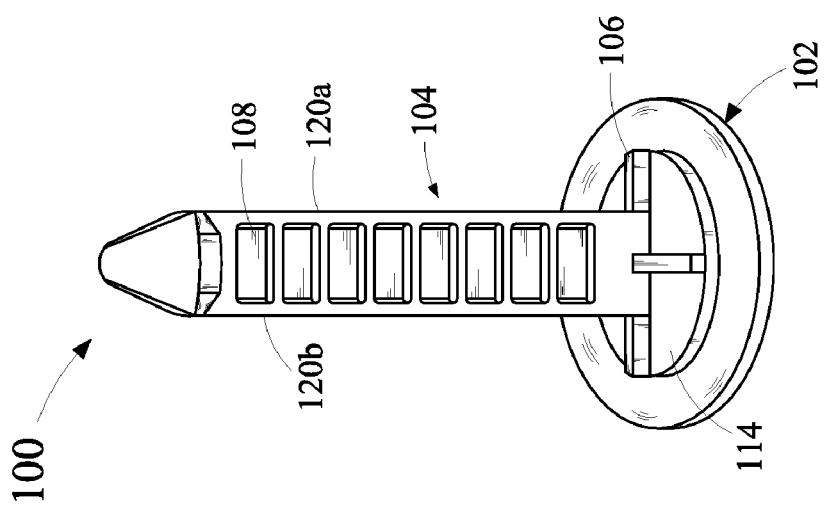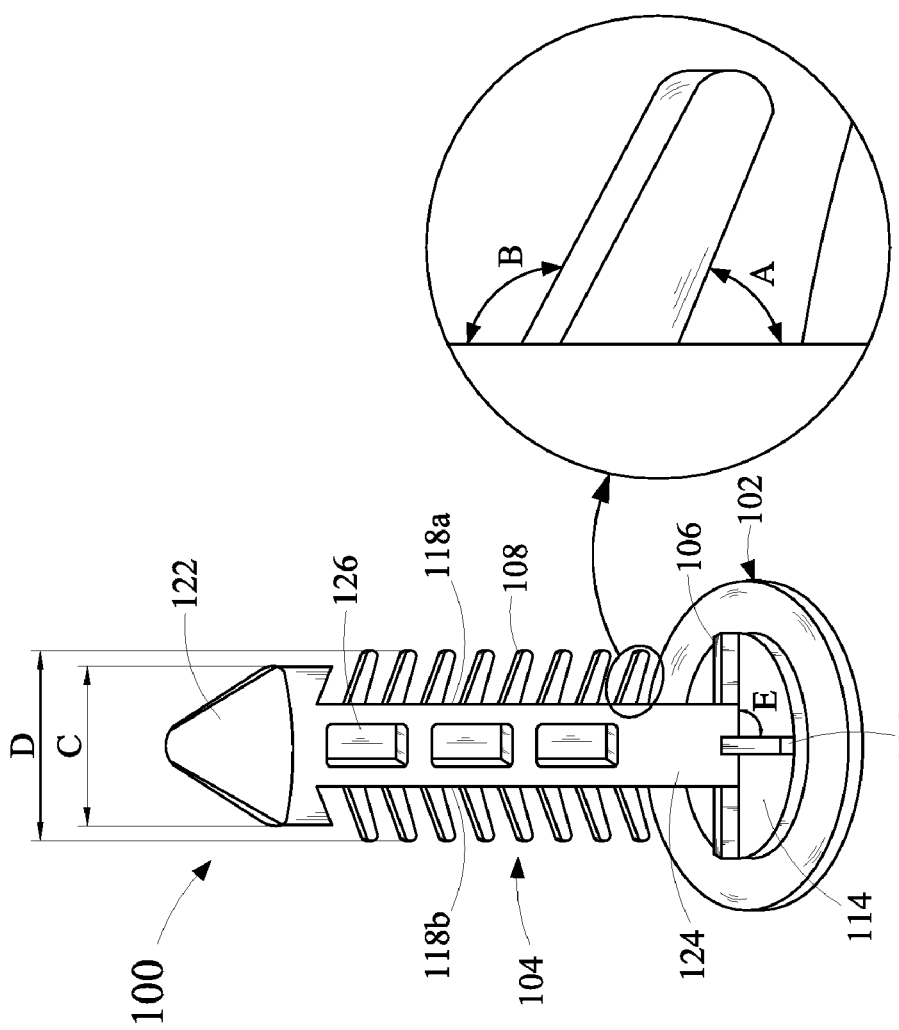

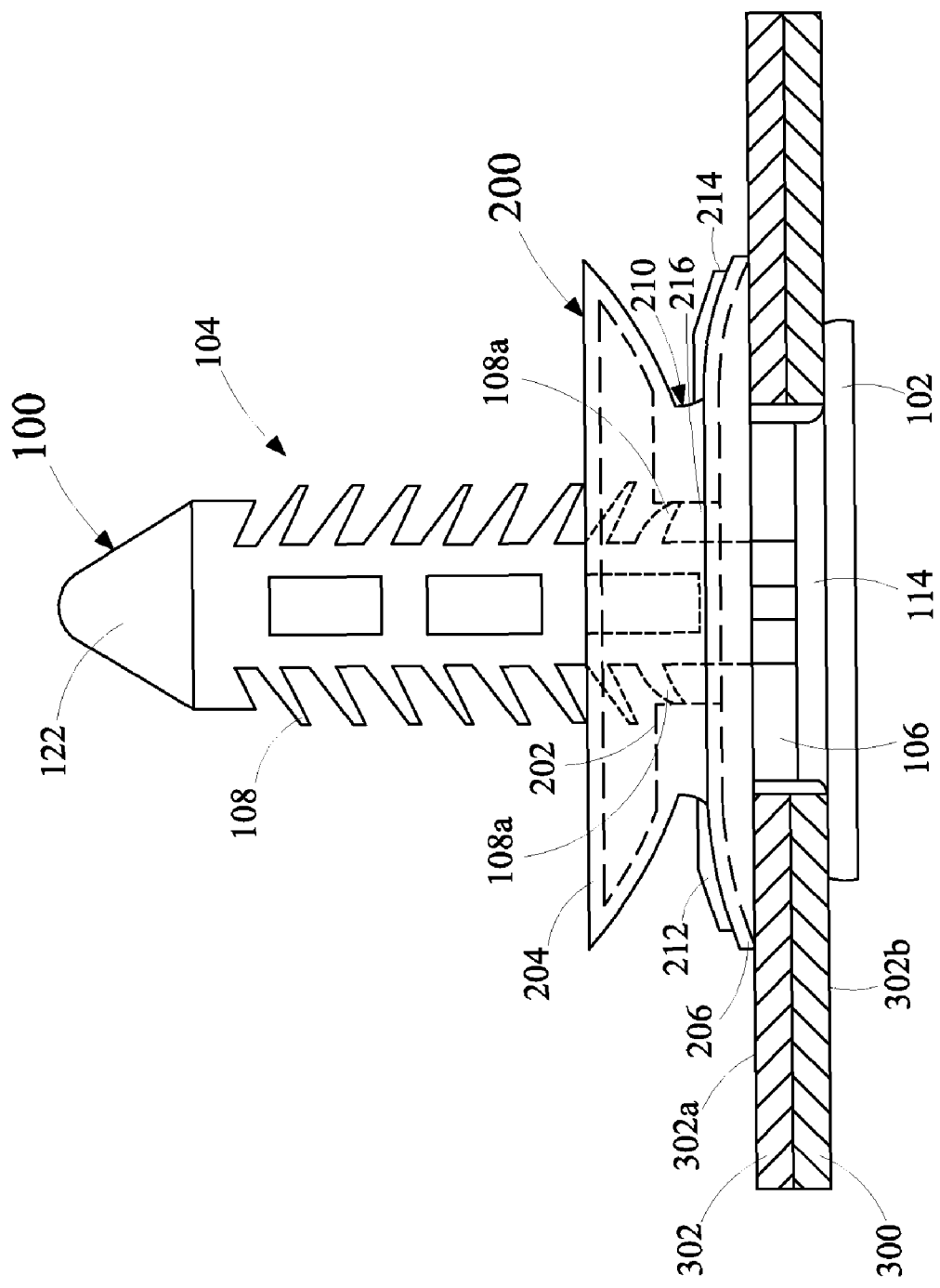

TWO-PIECE FASTENER

FIELD OF THE INVENTION

The present invention relates, in general, to fasteners, and, more particularly, to a two-piece fastener for being used to assemble and attach at least two members, such as automobile panels.

BACKGROUND OF THE INVENTION

Typically, fasteners are utilized to attach two or more members (hereinafter referred to as "members"), such as panels (for example, hardboard panels), and the like. Suitable examples of the fasteners used for attaching the members include, but are not limited to, nuts and bolts, rivets and push-pins. However, it has been observed that use of such conventional fasteners is associated with one or more limitations. For example, screwing the nuts and bolts together is time consuming, and requires the use of tools, such as wrenches, for such screwing. Similarly, fastening of the rivets also requires the use of tools, such as hammers and mallets. However, the use of such tools may lead to formation of scratches and/or dents on surfaces of the members. Further, materials used for manufacturing the nuts and bolts and the rivets may undergo rusting, which may be caused by the action of oxygen and moisture, over a period of time.

As described above, the push-pins have also been utilized to attach the members. Specifically, a conventional push-pin is pushed in through-openings that are configured on the respective members, in order to retain the members together. More specifically, the conventional push-pin includes one or more sets of fins configured along a length of a shank of the conventional push-pin. Upon insertion of the shank within the through-openings, the fins configured thereon deflect, and then spring back to rest around a periphery of a through-opening of the through-openings to create a back pressure for joining the members. The back pressure around the periphery of the through-opening prevents the conventional push-pin from being extracted from the through-openings, thereby preventing separation of the members.

However, edges of the through-openings are generally rough and may include burrs, which during the insertion of the conventional push-pin, tend to shear material away from surfaces of the fins. Shearing of the material from the surfaces of the fins results in creation of a reduced back pressure, which may cause premature failure of the conventional push-pins to securely hold the members together. Further, over a period of time, conventional push-pins may weaken and lose an ability thereof to securely hold the members together.

In addition, use of such conventional push-pins limits in facilitating a proper positioning thereof in the through-openings of the members, thereby resulting in improper fixing of the conventional push-pins in the through-openings. Such a drawback associated with the use of the conventional push-pins results in a weak attachment between the members.

Accordingly, there exists a need for a fastener that is capable of attaching at least two members, and exerting sufficiently high back pressure for securely holding the at least two members together. Further, there exists a need for a fastener, which is capable of being positioned properly and firmly onto at least two members.

SUMMARY OF THE INVENTION

In view of the forgoing disadvantages inherent in the prior-art, the general purpose of the present invention is to provide a fastener, to include all advantages of the prior art, and to overcome the drawbacks inherent in the prior art.

An object of the present invention is to provide a fastener that attaches at least two members, such as automobile panels, and exerts sufficiently high back pressure for securely holding the at least two members together.

An object of the present invention is to provide a fastener that is capable of being positioned properly and firmly onto at least two members, such as automobile panels.

In light of the above objects, in an aspect of the present invention, a fastener is provided. The fastener comprises a stud member and a nut member. The stud member includes a base portion, a stem, a plurality of locating features, and, a plurality of slanted ridges. The stem extends vertically from the base portion. Further, the stem has a head portion and a body portion. The body portion of the stem is positioned on the base portion for enabling the stem to vertically extend from the base portion. The plurality of locating features extends from the body portion, and is disposed on the base portion, such that, locating features of the plurality of locating features are spaced apart at a predetermined angle from each other. The plurality of slanted ridges extends from the stem, such that, slanted ridges of the plurality of slanted ridges are spaced apart at a predetermined distance from each other. The nut member includes a central element configured to have two projecting members extending opposite to each other from a periphery of the central element. The central element includes an aperture therewithin for receiving the stem therethrough and for interlocking the nut member with the stud member to retain the stud member at a locked configuration.

The stud member of the fastener may be provided into through-openings configured on at least two members with an aim of assembling and attaching the at least two members, such as at least two panels (automobile panels). The plurality of locating features of the stud member facilitates a user for locating the through-openings configured on the at least two members. More particularly, the plurality of locating features facilitates the user for proper positioning of the stud member in the through-openings to avoid improper fixation of the stud member in the through-openings. Subsequently and in order to assemble and attach the at least two members, the nut member is slid downwardly over the stud member after the head portion of the stem is received by the aperture of the central element of the nut member. More specifically, the nut member is pushed to slide downward at a proximal position to the base portion for interlocking the nut member with the stud member to retain the stud member at a locked configuration. At the lock configuration, a pair of ridges of the plurality of ridges rests on a portion of the central element, when the stem is received through the aperture of the central element, and a projecting member of the two projecting members is flattened for exerting a back pressure on a member of the at least two members, thereby assembling and attaching the at least two members. A circumferential area surrounded by the nut member on the member is substantially larger, which exerts sufficiently high back pressure, thereby avoiding a premature failure of the fastener for securely holding the at least two members.

This together with the other aspects of the present invention, along with the various features of novelty that characterized the present invention, is pointed out with particularity in the claims annexed hereto and forms a part of the present invention. For a better understanding of the present invention, its operating advantages, and the specified object attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

FIGS. 2A and 2B illustrate side perspective views of a stud member of the fastener of FIG. 1, in accordance with an exemplary embodiment of the present invention;

FIGS. 4A to 4C illustrate various stages of assembling and attaching panels by utilizing the fastener of FIG. 1, in accordance with an exemplary embodiment of the present invention.

Like reference numerals refer to like parts throughout the description of several views of the drawings.

DETAILED DESCRIPTION OF THE INVENTION

For a thorough understanding of the present invention, reference is to be made to the following detailed description, including the appended claims, in connection with the above-described drawings. Although the present invention is described in connection with exemplary embodiments, the present invention is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The term "first," "second," and the like, herein do not denote any order, elevation or importance, but rather are used to distinguish placement of one element over another. The terms "a" and "an" herein do not denote a limitation of quantity, but rather denote the presence of at least one of the referenced item.

The present invention provides a fastener for attaching at least two members, such as at least two panels (like hardboard panels), and more specifically, at least two automobile panels. The fastener is a two-piece fastener that includes a stud member and a nut member. The stud member of the fastener may be provided into through-openings configured on respective members of the at least two members. Subsequently, the nut member is adapted to receive the stud member, and is caused to be slid over the stud member for interlocking the nut member with the stud member to assemble and attach the at least two members. The nut member exerts sufficiently high back pressure, which in turn enables the fastener to hold securely the at least two members for a longer period of time. Further, the fastener is equipped with a plurality of locating features that help a user to locate the through-openings configured on the respective members. The fastener of the present invention is explained in detail in conjunction with FIGS. 1, 2A, 2B, 3A, 3B and 4A-4C.

Figure 1:
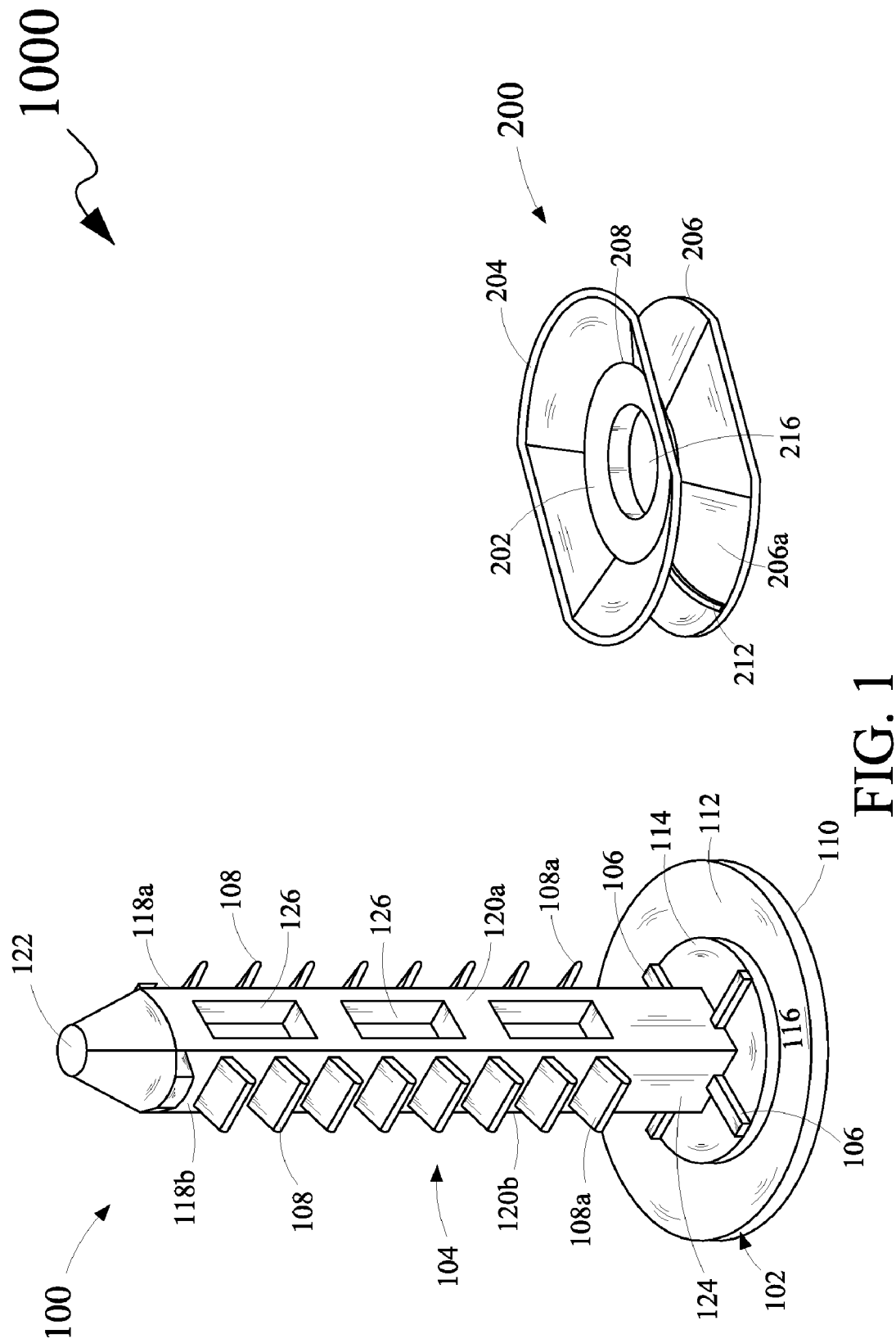
FIG. 1 illustrates an unassembled perspective view of a fastener, in accordance with an exemplary embodiment of the present invention.
Figure 3B:
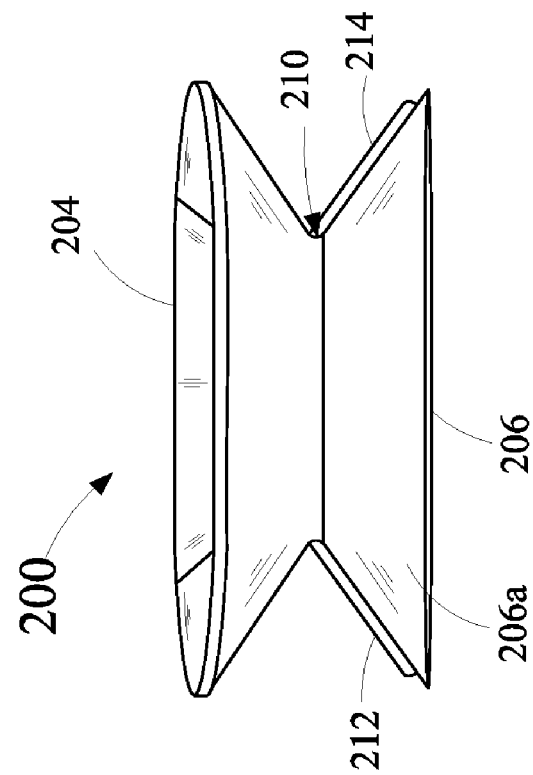
FIGS. 3A and 3B illustrate various views of a nut member of the fastener of FIG. 1, in accordance with an exemplary embodiment of the present invention.

Referring now to FIGS. 1 to 3B, wherein various views of a fastener 1000 including a stud member 100, and a nut member 200 are illustrated, according to an exemplary embodiment of the present invention. More particularly, FIG. 1 illustrates an unassembled perspective view of the fastener 1000. Further, FIGS. 2A and 2B illustrate side perspective views of the stud member 100 of the fastener 1000. Furthermore, FIG. 3A illustrates top view of the nut member 200 of the fastener 1000. In addition, FIG. 3B illustrates a side perspective view of the nut member 200 of the fastener 1000.

As shown in FIG. 1, the fastener 1000 is a two-piece fastener that includes the stud member 100 and the nut member 200. The fastener 1000 including the stud member 100 and the nut member 200 may be used to attach at least two members, such as at least two panels (and more specifically, at least two automobile panels), and the like, with the help of through-openings (not shown) formed on the at least two members. For the purpose of this description, the fastener 1000 is used to establish attachment of two panels, as described below with reference to FIGS. 4A and 4B.

The fastener 1000, including the stud member 100 and the nut member 200, is made of a plastic material. For example, the fastener 1000 may be made of nylon 66. In one embodiment of the present invention, the stud member 100 and the nut member 200 of the fastener 1000 are obtained by molding the plastic material. However, it will be evident to a person skilled in the art that other types of plastic materials and processes may be used for manufacturing the fastener 1000.

Referring particularly to FIGS. 1 to 2B, the stud member 100 includes a base portion 102; a stem 104; a plurality of locating features, such as locating features 106; and a plurality of slanted ridges, such as slanted ridges 108. The base portion 102 is substantially circular in shape, and having a flat outerside 110 and a flat underside 112. However, it will be evident to a person skilled in the art to configure the base portion 102 having any other shape, such as a round shape, a binder shape, a crowned shape, and the like. The base portion 102 has a collar 114 disposed on the flat underside 112. Further, around the collar 114, there is a circumferential space represented by a surface 116 (hereinafter referred to as 'circumferential space 116') on the flat underside 112. Furthermore, the stem 104 is adapted to extend vertically from a center portion of the collar 114 of the base portion 102.

The stem 104 is adapted to include two pairs of opposite sides constituted by opposite sides 118a and 118b (hereinafter interchangeably referred to as 'opposite sides 118'); and opposite sides 120a and 120b (hereinafter interchangeably referred to as 'opposite sides 120'), a head portion 122, and a body portion 124. The body portion 124 of the stem 104 is positioned on the base portion 102 for enabling the stem 104 to extend vertically from the base portion 102. More specifically, the body portion 124 of the stem 104 is provided to extend from the collar 114 at the flat underside 112 of the base portion 102 for enabling the stem 104 to extend vertically from the base portion 102. The head portion 122 of the stem 104 is provided at a top end portion (not numbered) of the stem 104. In one embodiment of the present invention, the head portion 122 is configured to include a conical structure. However, it will be evident to a person skilled in the art that the head portion 122 may be configured to have any other structure, such as a triangular structure, a round structure, a blunt structure, and the like. Further, the opposite sides 118a and 118b of the stem 104 include a predetermined number of the slanted ridges 108 extending from the stem 104. More particularly, the slanted ridges 108 are spaced apart at a predetermined distance from each other, and extend from the opposite sides 118a and 118b of the body portion 124 of the stem 104 at a predetermined downward angle towards the base portion 102. The predetermined number of the slanted ridges 108, and the predetermined distance between the slanted ridges 108 may be set depending on a manufacturer's preference.

Referring to FIG. 2A, an encircled portion of the stem 104 shows an enlarged view of a slanted ridge of the slanted ridges 108 to describe an angular projection of the slanted ridge from the stem 104. The slanted ridges 108 project at an angle depicted by 'A' in a downward direction towards the base portion 102, and at an angle depicted by 'B' in an upward direction angle away from the base portion 102 (more particularly, towards the head portion 122). Without departing from the scope of the present invention, in the present embodiment, 'A' represents an angle of about 65 degrees, and 'B' represents an angle of about 125 degrees. Further, the slanted ridges 108 are flexible and bear a rectangular shape (as shown in FIGS. 1 and 2B). However, the slanted ridges 108 may have any other shape, such as a square shape and a conical shape.

Further, the head portion 122 has a specific diameter, represented by 'C,' which is smaller than a dimension, represented by 'D' of the body portion 124. The dimension as represented by 'D' is hereinafter referred to as a stem-ridge dimension 'D'. Both the diameters, i.e. the diameter 'C' and the stem-ridge dimension 'D' are such that upon placement of the stud member 100 into a through-opening (not shown) of a member, such as a panel (not shown), the head portion 122 and the stem 104 is inserted without making any contact with edges of the through-opening to avoid shearing of material from surfaces of the slanted ridges 108. Without departing from the scope of the present invention, the diameter 'C' is about 7 millimeters, and the stem-ridge dimension 'D' is about 8 millimeters. Further, for proper placement of the stud member 100 in the through-opening, the locating features 106 are provided. The locating features 106 facilitate a user for proper positioning of the stud member 100 in the through-opening for avoiding improper insertion of the stud member 100 in the through-opening.

The locating features 106 extend from the body portion 124 of the stem 104, and are disposed on the collar 114 at the flat underside 112 of the base portion 102. For the purpose of representation, in one embodiment of the present invention, four locating features, such as the locating features 106 extend from the body portion 124, as shown in FIG. 1. More specifically, the locating features 106 are disposed on the collar 114, and are spaced apart from each other at a predetermined angle represented by 'E'. Without departing from the scope of the present invention, the predetermined angle 'E' between every two consecutive locating features of the locating features 106 is about 90 degrees. However, it will be evident to a person skilled in the art that any desired number of locating features, such as the locating features 106, having any other angle between every two locating features of the locating features 106, may be disposed on the collar 114 of the base portion 102.

Furthermore, as shown in FIGS. 1 and 2A, the stud member 100 at the opposite sides 120a and 120b of the stem 104 includes pockets 126. The pockets 126 are configured on the opposite sides 120a and 120b (shown in FIG. 2B) of the stem 104 for a purpose of reducing the overall weight of the stud member 100, and to save the plastic material required for manufacturing the fastener 1000.

Figure 3A:
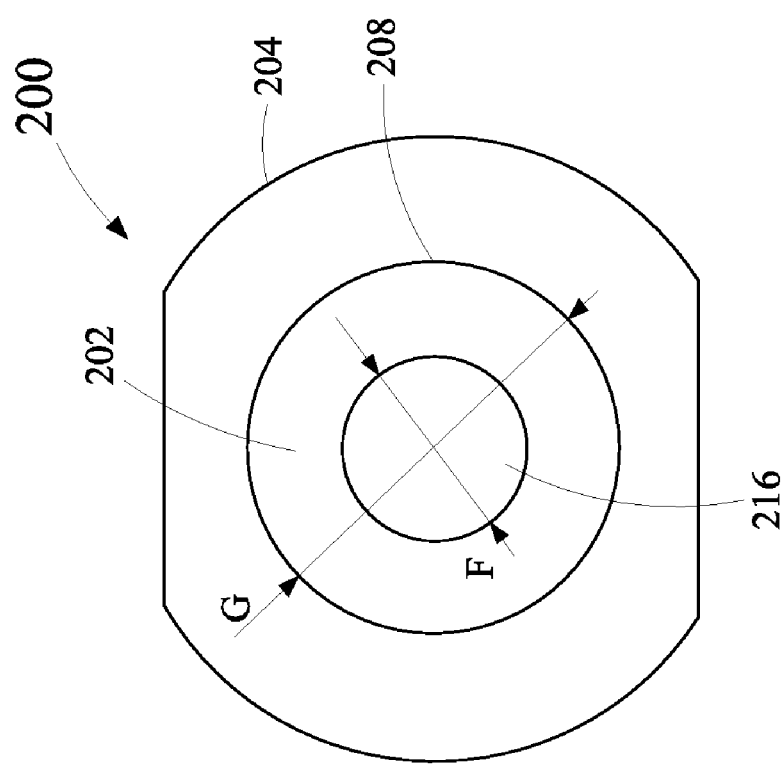

Referring now to FIGS. 1, 3A and 3B, the nut member 200 includes a central element 202, which is configured to have two projecting members, such as a first projecting member 204, and a second projecting member 206, extending opposite to each other from a periphery 108 of the central element 202. More particularly, the first projecting member 204 extends vertically upwards and outwards from the periphery 208 of the central element 202. Similarly, the second projecting member 206 extends vertically downwards and outwards from the periphery 208 in a direction opposite to the first projecting member 204, such that, the first projecting member 204 and the second projecting member 206 configure a structure substantially similar to an hourglass structure having a neck portion 210 (as shown in FIG. 3B). In one embodiment of the present invention, each of the first projecting member 204 and the second projecting member 206 has two arc-shaped opposite sides (not numbered), and two straight opposite sides (not numbered). Further, supporting extensions, such as two supporting extensions 212 and 214 (as shown in FIG. 3B) extend from two opposite sides (not numbered) of the neck portion 210, and are disposed on a lower portion 206a of the second projecting member 206 along the two arc-shaped opposite sides of the central element 202. The two supporting extensions 212 and 214 impart an additional strength to the second projecting member 206. However, it will evident to a person skilled in the art that such supporting extensions may alternately be disposed on either a lower portion (not numbered) of the first projecting member 204, or on the lower portions of both the projecting members, i.e. on the first projecting member 204 and on the second projecting member 206.

Further, the central element 202 includes an aperture 216 therewithin for receiving the stem 104 therethrough for interlocking the nut member 200 with the stud member 100 to retain the stud member 100 at a locked configuration. More particularly, the aperture 216 is configured at a center portion (not numbered) of the central element 202. The aperture 216 has a first diametric dimension represented by 'F' (hereinafter referred to as first diametric dimension 'F'), which is equal to the dimension of the head portion 122, i.e., the diameter 'C'. Further, the first diametric dimension 'F' is smaller than the stem-ridge dimension 'D'. More particularly, and without departing from the scope of the present invention, the first diametric dimension 'F' of the aperture 216 is about 7 millimeters. Further, the central element 202 is associated with a second diametric dimension represented by 'G' characterizing enough space for resting a pair of slanting ridges of the slanted ridges 108 thereon, upon insertion of the nut member 200 onto the stud member 100. Without departing from the scope of the present invention, the second diametric dimension 'G' of the central element 202 is about 13.5 millimeters.

Referring back to FIG. 1, the fastener 1000, including the stud member 100 and the nut member 200, has suitable dimensions thereof that help a user to easily assemble and attach the at least two members. More particularly, the stud member 100, including the base portion 102 and the stem 104, is adapted to have such a dimension that is capable of easily assembling and attaching the at least two members. Without departing from the scope of the present invention, the total dimension (i.e. length) of the stud member 100 is about 27 millimeters. Further, a length of the nut member 200 along the two straight opposite sides of the first projecting member 204 and/or the second projecting member 206 is about 23 millimeters. Further, a diameter of the first projecting member 204 and/or the second projecting member 206 of the nut member 200 is 19.5 millimeters. However, it will be evident to a person skilled in the art that the stud member 100 and the nut member 200 may be of any suitable dimension to configure the fastener 1000.

Figure 4A:
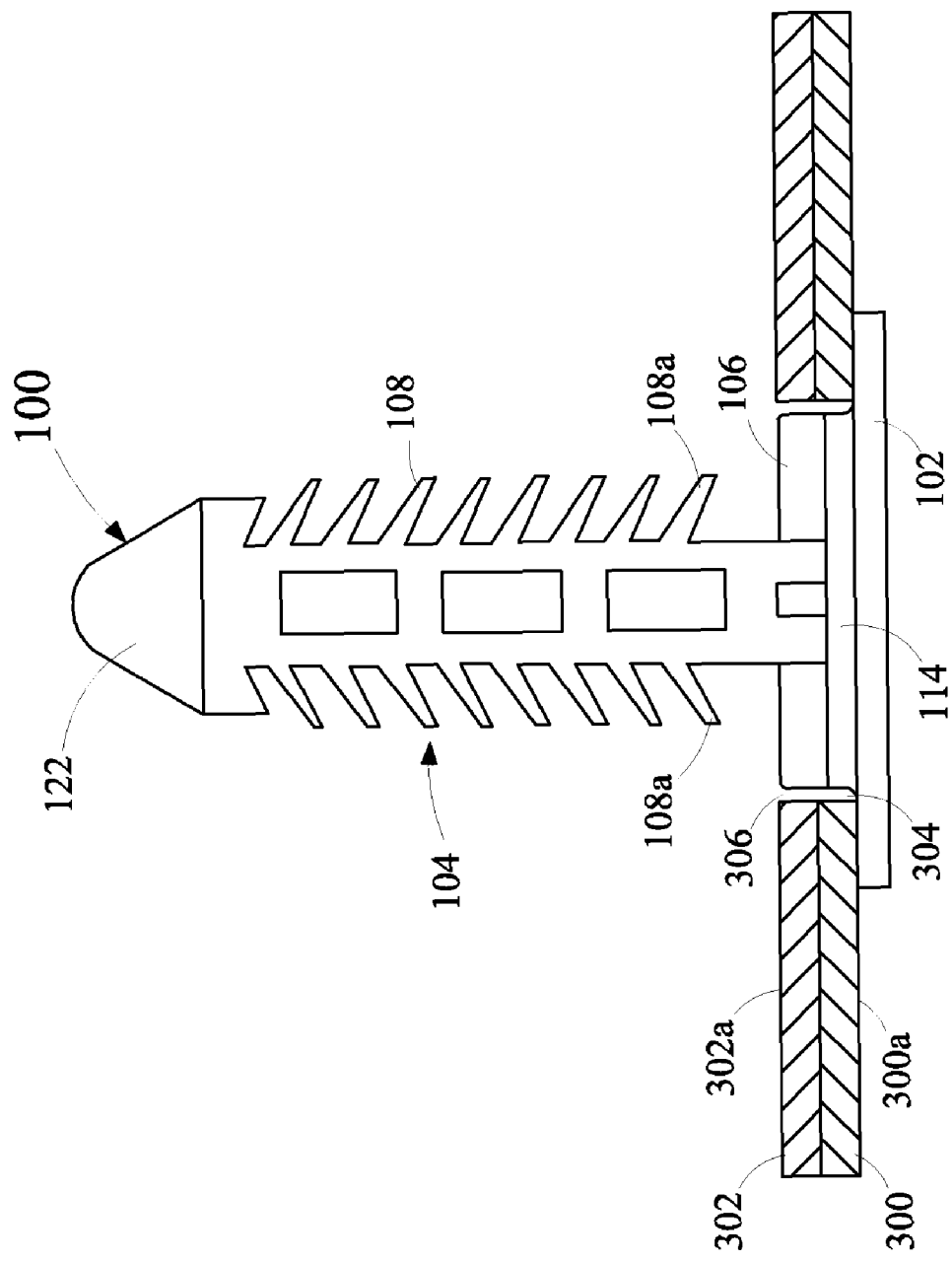
Figure 4C:
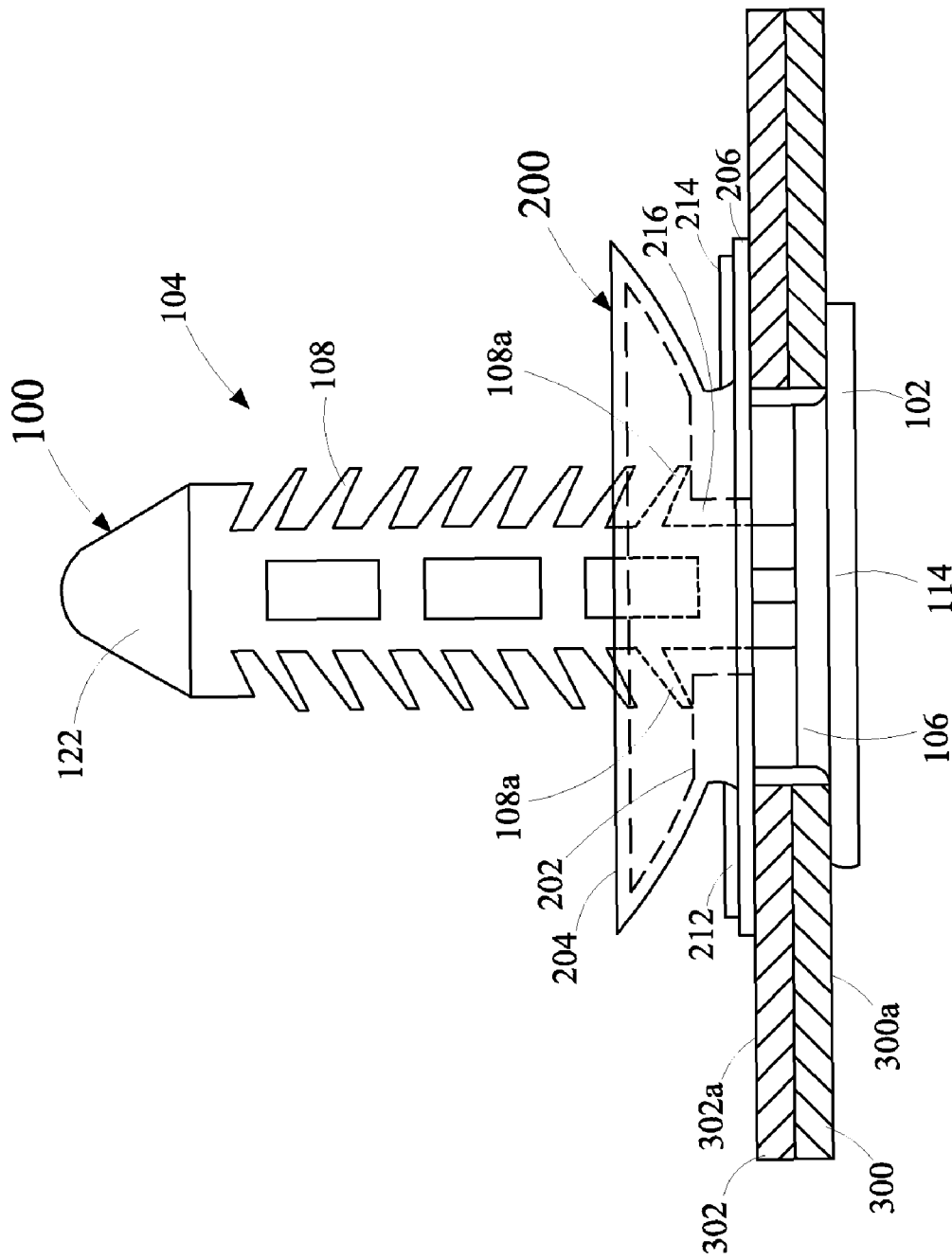

Referring now to FIGS. 4A to 4C, wherein various stages of assembling and attaching panels, and more particularly, automobile panels, such as a first panel 300 and a second panel 302, by utilizing the fastener 1000 are illustrated, in accordance with an exemplary embodiment of the present invention. More particularly, FIG. 4A illustrates a cross-sectional view of the first panel 300 and the second panel 302 for representing a first stage of assembling and attaching. Further, FIG. 4B illustrates the cross-sectional view of the first panel 300 and the second panel 302 for representing a second stage of assembling and attaching. Furthermore, FIG. 4C illustrates the cross-sectional view of the first panel 300 and the second panel 302 for representing a third stage of assembling and attaching. As shown in FIGS. 4A to 4C, the first panel 300 and the second panel 302 have a first through-opening 304 and a second through-opening 306, respectively, configured thereon.

At the first stage, as shown in FIG. 4A, the first panel 300 and the second panel 302 are placed one above the other, in such a manner that the first through-opening 304 and the second through-opening 306 are aligned over each other.

Furthermore, in order to assemble and attach the first panel 300 and the second panel 302, the stud member 100 of the fastener 1000 is inserted into the through-opening 304 and the second through-opening 306, until the circumferential space 116 on the flat underside 112 of the base portion 102 positions adjacent to a bottom side 300a of the first panel 300. The locating features 106 help a user to locate the first circumferential space 304 and the circumferential space 306, and enable the stud member 100 to be positioned at the bottom side 300a of the first panel 300 along the circumferential space 116, thereby avoiding improper insertion of the stud member 100 in the first through-opening 304 and the through-opening 306. At this point, the stud member 100 is provided with a back support on the flat outerside 110 of the base portion 102, in order to be retained in the first through-opening 304 and the second through-opening 306. The back support may be provided by an article, such as an assembly table on which the first panel 300 and the second panel 302 are kept in order to be assembled and attached together. Further, the back support may also be provided by the user when he/she places his/her fingertip at the flat outerside 110 of the base portion 102, and subsequently applies force required to retain the stud member 100 in the first through-opening 304 and the second through-opening 306.

Thereafter, at the second stage, as shown in FIG. 4B, the nut member 200 is adapted to receive the stem 104 of the stud member 100 through the aperture 216. For enabling the nut member 200 to receive the stem 104, the user may hold the nut member 200 from a periphery (not numbered) of the first projecting member 204 in such a manner that the second projecting member 206 is directed downwardly. Further, the aperture 216 of the nut member 200 is aligned with the head portion 122 of the stem 104. The first diametric dimension 'F' of the aperture 216 is equal to the diameter 'C' of the head portion 122, and said property enables the user to easily align the aperture 216 with the head portion 122. After aligning the aperture 216 with the head portion 122, the nut member 200 is pressed in a downward direction on the stem 104 until the second projecting member 206 of the nut member 200 contacts a top side 302a of the second panel 302. As described above, the first diametric dimension 'F' of the aperture 216 is smaller than the stem-ridge dimension 'D,' and accordingly, application of a downward pressure on the nut member 200 enables the nut member 200 to contact the top side 302a of the second panel 302. At such a stage, the second projecting member 206 tends to exhibit a curved structure, and the neck portion 210 is capable of maintaining interference between the first projecting member 204 and the second projecting member 206.

The aperture 216 is a smooth aperture, and does not include any burrs. Such a property of the aperture 216 helps avoiding any shearing of material from the surfaces of the slanted ridges 108 during the insertion and sliding of the nut member 200 onto the stem 104 of the stud member 100.

Furthermore at the third stage, as shown in FIG. 4C, the nut member 200 is further pressed in the downward direction towards the second panel 302 until a pair of slanted ridges of the slanted ridges 108 of the stem 104 rests on a portion (not numbered) of the central element 202 around the aperture 216 for interlocking the nut member 200 with the stud member 100 to retain the stud member 100 at a locked configuration. For the purpose of this description, a last pair of slanted ridges 108a of the slanted ridges 108 of the stem 104 rests on the portion of the central element 202 around the aperture 216 for interlocking the nut member 200 with the stud member 100. The last pair of slanted ridges 108a refers to the pair of slanted ridges located at a bottom portion (not numbered) of the body portion 124.

At the locked configuration, the last pair of slanted ridges 108a of the slanted ridges 108 rests on the portion of the central element 202 around the aperture 216, and the second projecting member 206 is flattened for exerting a back pressure to firmly retain the fastener 1000 in place, thereby assembling and attaching the first panel 300 with the second panel 302. Further at the locked configuration, the two supporting extensions 212 and 214 impart additional strength to the second projecting member 206 for maintaining the back pressure for securely assembling and attaching the first panel 300 and the second panel 302 together and for a longer period of time, and for avoiding premature failure of the fastener 1000 to firmly hold the first panel 300 and the second panel 302. Also, the second projecting member 206 of the nut member 200, and the flat underside 112 of the base portion 102 of the stud member 100, respectively, cover substantial circumferential area around the second through-opening 306 and the first through-opening 304, thereby exerting a significantly high back pressure to avoid a premature failure of the fastener 1000 for securely holding the first panel 300 and the second panel 302 for a longer period of time.

The present invention provides a fastener, such as the fastener 1000, which offers the following advantages. The fastener provides sufficiently high back pressure, which in turn helps in securely holding at least two members, such as automobile panels, together for a longer period of time. Further, the structural configuration of the fastener avoids a premature failure thereof for securely holding the at least two members. Furthermore, locating features, such as the locating features 106, provided in the fastener facilitate a user for proper positioning of the fastener in through-openings configured on the at least two members.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, to thereby enable others skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present invention.

What is claimed is:

1. A fastener, comprising:
   a stud member comprising
      a base portion,
         said base portion comprising a flat underside and a collar disposed on said flat underside,
      a stem extending vertically from the base portion, the stem having a head portion and a body portion, wherein the body portion of the stem is positioned on the base portion for enabling the stem to extend vertically from the base portion,
      a plurality of locating features extending from the body portion, and disposed on the base portion, such that, locating features of the plurality of locating features are spaced apart at a predetermined angle from each other, and
      a plurality of slanted ridges extending from the stem, such that, slanted ridges of the plurality of slanted ridges are spaced apart at a predetermined distance from each other; and
   a nut member comprising a central element configured to have two projecting members extending opposite to each other from a periphery of the central element, the central element comprising an aperture therewithin for receiving the stem therethrough for interlocking the nut member with the stud member to retain the stud member at a locked configuration,
      wherein the two projecting members comprise a structure substantially similar to a hourglass structure when said stem of said stud member is not received through said nut member, and
      wherein one of the projecting member may be flattened when said stem of said stud member is received through said nut member.

2. The fastener of claim 1, wherein the plurality of slanted ridges extends from two opposite sides of the body portion of the stem.

3. The fastener of claim 1, wherein the aperture of the central element of the nut member is capable of aligning with the head portion of the stem for downwardly sliding the nut member for receiving the stem therethrough and for interlocking the nut member with the stud member to retain the stud member at the locked configuration.

4. The fastener of claim 1, wherein a pair of ridges of the plurality of ridges rests on a portion of the central element, when the stem is received through the aperture and a projecting member of the two projecting members is flattened to retain the stud member at the locked configuration.

5. The fastener of claim 1, wherein the stud member is made of a plastic material.

6. The fastener of claim 1, wherein the nut member is made of a plastic material.

* * * * *